United States Patent Office 2,720,191
Patented Oct. 11, 1955

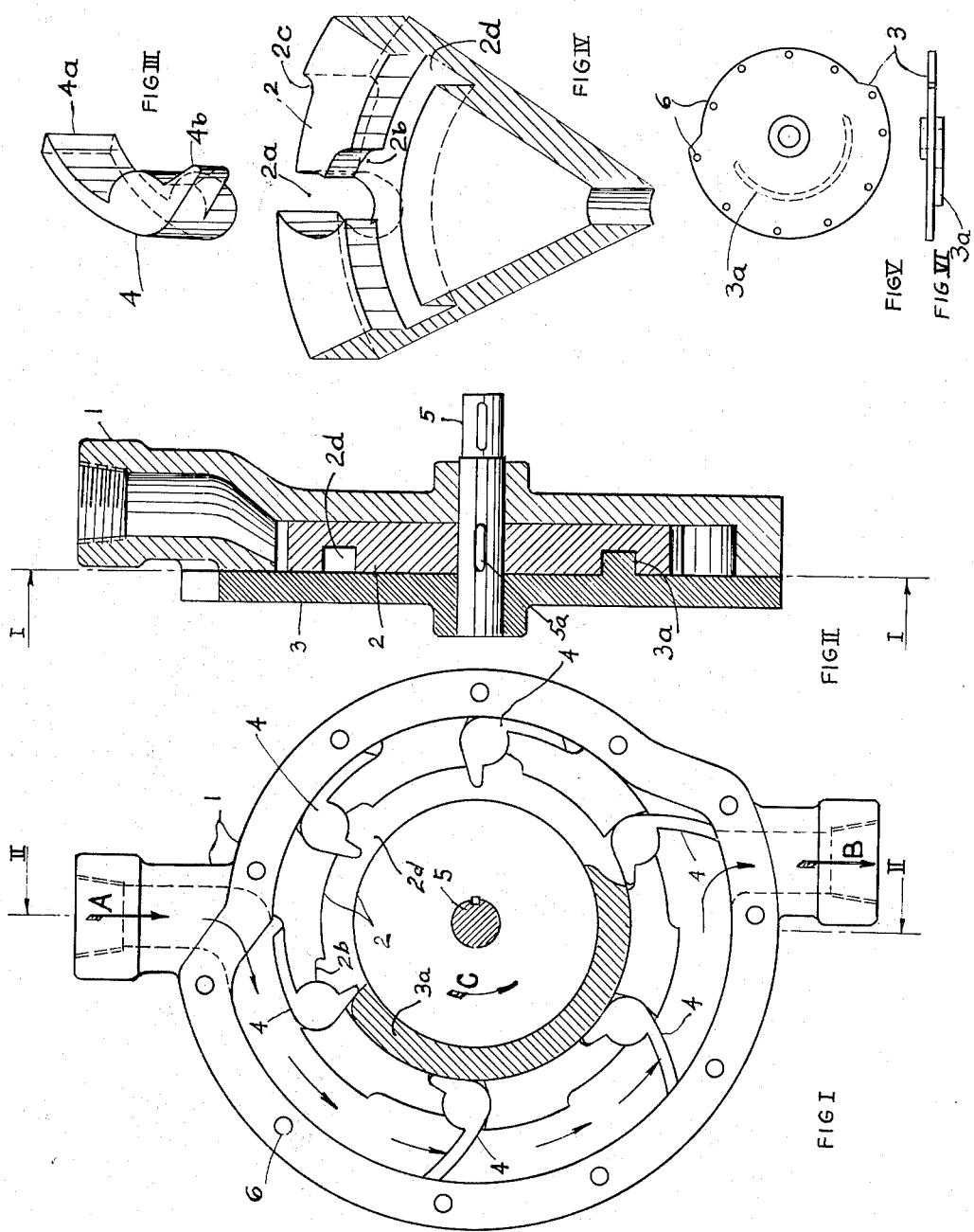

2,720,191

FLOW MEASURING MEANS

Albert B. Vas, Ellwood City, Pa.

Application March 3, 1953, Serial No. 339,954

1 Claim. (Cl. 121—93)

My invention relates to a flow measuring device, and more particularly to a device for measuring the flow of liquids under pressure by measuring the quantity of the liquid passing therethrough.

An outstanding disadvantage of liquid flow measuring devices in general use, is that errors are introduced with increase in the velocity of flow of the liquid, so that with higher velocities the instrument registers too high, therefore affecting the accuracy of flow measurements. A still further disadvantage of flow measuring devices in general use is that they are somewhat complicated in construction, expensive to manufacture, and have a tendency to get out of adjustment or even to break down after a period of use.

An object of my invention is to provide a novel flow measuring device which is devoid of the above named disadvantages, and which will accurately measure the quantity of liquid passing through it and in this way give an accurate registration of the flow of the liquid irrespective of the velocity of flow.

A further object of my invention is to provide a liquid flow measuring device for measuring the rate of flow of gasoline as it is pumped by gasoline pumps or many other types of liquid whose quantity is to be measured as it flows, which device includes a wheel which makes a predetermined number of revolutions as a given amount of liquid flows therethrough, thereby giving an accurate indication of the amount of flow by noting the number of rotations of the wheel.

Other objects and advantages of my invention will become apparent from a study of the following description taken with the accompanying drawing, wherein:

Figure I is an interior plan view of a flow measuring device embodying the principles of my invention and taken along line I—I of Figure II.

Figure II is a transverse cross-sectional view taken along line II—II of Figure I.

Figure III is an enlarged perspective view of one of the pivotal vane units shown in Figure I.

Figure IV is an enlarged fragmentary perspective view of a segment of the wheel 2 shown in Figures I and II.

Figure V is a plan view of the cover 3 shown in reduced scale, and

Figure VI is a side view of the cover shown in Figure V.

Referring more particularly to Figures I and II, numeral 1 denotes a stationary housing of somewhat cup shape and having fitted in a well portion thereof a wheel or rotor 2 provided with an annular slot 2d. The wheel is enclosed within the housing by a cover 3 which is provided with a semi-circular protuberance 3a extending from the face thereof which is adapted to fit into a portion of the slot 2d of the wheel 2.

Wheel 2 is provided with a plurality of bores 2a as shown more clearly in Figure IV, into which are fitted pivotal vane units 4. As shown in Figure III, each vane unit 4 is formed of a centrally substantially round portion, a wing or vane portion 4a and a stop projection 4b.

Slots 2c are formed along peripheral portions of the wheel adjacent bore 2a for snugly receiving the vane portions 4a. Similarly, stop forming slots 2b are formed adjacent the bores 2a corresponding in shape to and snugly receiving the stop projections 4b.

Wheel 2 is keyed to shaft 5 by means of keys or splines 5a. Shaft 5 drives a counter (not shown) of any well known type which measures the number of revolutions of the shaft and thus gives an indication of the amount of liquid flow.

The cover 3 closes the housing in a liquid-tight manner by smoothly ground surfaces and is tightly secured thereto by means of screws 6 or other fastening means. The housing is provided with an inlet for introducing liquid under pressure to be measured, and whose direction is indicated by arrow A, which liquid then flows through a susbtantially semi-circular portion of the housing and flows outwardly thereof through an outlet indicated by arrow B.

It will be particularly noted that the housing is provided with a space between the periphery of the wheel and the housing interior peripheral wall, which space extends only through the left half of the unit as viewed in Figure I. The right half is provided with no space between the wheel and the interior peripheral wall of the housing.

In operation, as liquid flows inwardly of the device in the direction indicated by arrow A and the succeeding arrows it will exert pressure against vane portions 4a of the pivotal units 4 and in so doing will exert a tangential force on the wheel 2 to cause rotation thereof. It will noted that the unit 4, just as it passes the inlet, will be in the retracted position as shown, that is, with its vane 4a disposed along the periphery of the wheel. However, as the stop projection 4b thereof strikes the end portion of the protuberance 3a, the unit 4 will be rotated within bore 2a to a position as illustrated by the two succeeding units 4 at the left of Figure I, that is, with their stop projections 4b seated within stop forming slots 2b of the wheel and with their vane portions extending across the space between the wheel periphery and the internal peripheral wall of the housing. Thus, the vane portions 4a are pushed against the housing wall or very close to it and the full force of the liquid flow is exerted against the vane portion of each unit as it passes the inlet and is turned to the position as shown at the left of Figure I.

As the units 4 pass the outlet the vane portions 4a strike the portion of the housing wall which becomes reduced in diameter, thus forcing the vane portion into the peripheral slots 2c of the wheel as shown at the right of Figure I, thus the vane portions slide along the internal peripheral housing wall until the unit passes the inlet at which time its stop projection 4b will strike the end of the semi-circular protuberance 3a and again rotate the unit to the vane-extended position.

It will be apparent that measured amounts of liquid are trapped between the units 4, therefore the number of rotations of wheel 2 denote the quantity of liquid flow irrespective of the velocity of flow of the liquid. Of course, the speed of rotation of wheel 3 would indicate the flow rate, hence any device such as a speedometer dial and pointer that is operatively connected to the wheel 2 will give an accurate indication of the amount of liquid flow as well as the rate of flow through the device.

Thus, it will be seen that I have provided an efficient flow measuring device which is particularly suitable for measuring the flow of gasoline and other liquids, which device is of relatively simple and inexpensive construction; furthermore, I have provided a flow measuring device whose accuracy is not affected by changes of velocity of flow, and which has relatively long life and is devoid of parts which are apt to get out of adjustment; furthermore, I have provided a flow measuring device wherein the liquid flow is carefully measured and registered by the number of rotations of a wheel or impeller propelled by the liquid flow so that a counter which measures the number of rotations of the wheel will give an accurate measurement of the quantity of liquid passing through the device.

While I have illustrated and described a certain specific embodiment of my invention, it will be apparent that this is by way of illustration only, and that various changes and modifications may be made within the contemplation of my invention and within the scope of the following claim.

I claim:

A liquid flow measuring device comprising a housing of substantially cup shape having an inlet and an outlet for the liquid to be measured disposed on substantially diametrically opposite portions of the housing, a wheel snugly seated within the cupped portion of the housing, a shaft rigidly secured to said wheel and extending through the axis of the housing, the number of rotations of said wheel and shaft being indicative of the volume of liquid flow, said wheel having a peripheral slot disposed adjacent the periphery thereof on one face the wheel, said housing provided with a cover having a substantially semi-circular protuberance fitted into a substantially semi-circular portion of said peripheral slot, said wheel provided with a plurality of bores spaced along the periphery thereof, each having a rotatable, substantially L-shaped vane unit fitted therein for selective movement to the vane-extended or vane-retracted position, said units provided with radially inwardly extending stop extensions forming a leg of said L-shape which are adapted to strike the end of said semi-circular protuberance for rotating the unit from the vane retracted to the vane extended position at a point just past said inlet, said housing having stop means for retracting said vane units at a point just past said outlet, said housing also being provided with a semi-circular portion of greater diameter than the remainder of the housing, extending between said inlet and outlet and providing a space between the wheel periphery and the internal peripheral wall of the housing, between which space said vanes are adapted to be extended, the housing portion of reduced diameter serving as said stop means for striking vane portions of said units and rotating said units to the vane-retracted position, whereby as said units move past the inlet and strike the end of said protuberance, said vanes will be extended substantially radially outwardly and will be then pushed by the liquid flow to rotate the wheel in accordance with the quantity of liquid flow and when they strike said housing portion of reduced diameter said outwardly extended vanes will be retracted and brought out of the path of the liquid.

References Cited in the file of this patent

UNITED STATES PATENTS

| | | |
|---|---|---|
| 197,954 | Tuerk | Dec. 11, 1877 |
| 204,430 | Frese | June 4, 1878 |
| 257,864 | Gurd | May 16, 1882 |
| 479,868 | Wood | Aug. 2, 1892 |
| 1,953,029 | Smith | Mar. 27, 1934 |
| 1,995,755 | Smith | Mar. 26, 1935 |